US009053438B2

(12) United States Patent
Marwah et al.

(10) Patent No.: US 9,053,438 B2
(45) Date of Patent: Jun. 9, 2015

(54) ENERGY CONSUMPTION ANALYSIS USING NODE SIMILARITY

(75) Inventors: Manish Marwah, Palo Alto, CA (US);
Geoff Lyon, El Granada, CA (US);
Martha Lyons, Sunnyvale, CA (US);
Chandrakant Patel, Fremont, CA (US);
Cullen Bash, Los Gatos, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 684 days.

(21) Appl. No.: 13/189,531

(22) Filed: Jul. 24, 2011

(65) Prior Publication Data
US 2013/0024141 A1  Jan. 24, 2013

(51) Int. Cl.
*G06Q 50/06* (2012.01)
*G01R 21/00* (2006.01)
*G06Q 10/04* (2012.01)

(52) U.S. Cl.
CPC ............... *G06Q 10/04* (2013.01); *G06Q 50/06* (2013.01)

(58) Field of Classification Search
CPC .............. G06F 17/30; G06F 17/30598; G06F 17/3071; G06F 17/30961; G06F 19/00; G06F 7/00; G01R 21/00; G06N 5/02; G06N 7/00; G06K 9/6224; G06K 9/6253; G06Q 50/06
USPC ..................... 702/61, 57, 60, 65, 81, 84, 127, 702/182–183, 188–189; 700/286, 291; 703/18; 705/412; 706/47, 50; 707/749
See application file for complete search history.

(56) References Cited

U.S. PATENT DOCUMENTS

| 5,852,560 | A  | 12/1998 | Takeyama et al. |
|-----------|----|---------|-----------------|
| 6,049,797 | A  | 4/2000  | Guha et al.     |
| 6,415,283 | B1 | 7/2002  | Conklin         |
| 6,564,197 | B2 | 5/2003  | Sahami et al.   |
| 6,691,044 | B2 | 2/2004  | Kobayashi et al.|
| 6,742,001 | B2 | 5/2004  | Ripley          |
| 6,862,540 | B1 | 3/2005  | Welch et al.    |
| 7,272,607 | B2 | 9/2007  | Udeshi et al.   |
| 7,287,026 | B2 | 10/2007 | Oommen          |

(Continued)

FOREIGN PATENT DOCUMENTS

| WO | WO0041114 | 7/2000 |
| WO | WO0126044 | 4/2001 |

OTHER PUBLICATIONS

Lyon et al., Applying IT to Solve Societal Grand Challenges: Residential Energy Monitoring Services as the First Pillar, Mar. 29-Apr. 2, 2011, 2011 Annual SRII Global Conference, IEEE Computer Society, pp. 113-119.*

(Continued)

*Primary Examiner* — Toan Le
(74) *Attorney, Agent, or Firm* — Tenner Law Firm

(57) ABSTRACT

Systems and methods of analyzing energy consumption using node similarity are disclosed. An example of a method may be carried out by program code stored on non-transient computer-readable medium and executed by a processor. The method includes assigning a similarity score to a plurality of nodes using at least one of: domain based rules, attribute based similarity metrics, and machine learning. The method also includes identifying a similar node from the plurality of nodes, for a node under consideration, based on the similarity score. The method also includes determining energy consumption of the node under consideration based on energy consumption of the similar node.

19 Claims, 7 Drawing Sheets

(56) References Cited

U.S. PATENT DOCUMENTS

| | | | |
|---|---|---|---|
| 7,415,418 B2 | 8/2008 | Zimmerman | |
| 7,620,632 B2 | 11/2009 | Andrews | |
| 7,634,464 B2 | 12/2009 | Chen et al. | |
| 7,707,085 B2 | 4/2010 | Sakurai et al. | |
| 7,801,878 B2 | 9/2010 | Hayes et al. | |
| 2002/0032684 A1 | 3/2002 | Kobayashi et al. | |
| 2002/0099587 A1 | 7/2002 | Kakihana et al. | |
| 2009/0083390 A1 | 3/2009 | Abu-Ghazaleh et al. | |
| 2009/0125529 A1 | 5/2009 | Vydiswaran et al. | |
| 2009/0248624 A1 | 10/2009 | Lammel et al. | |
| 2010/0070102 A1* | 3/2010 | Benes et al. | 700/296 |
| 2010/0076687 A1 | 3/2010 | Deyoung et al. | |
| 2010/0100403 A1 | 4/2010 | Pollock et al. | |
| 2010/0145629 A1 | 6/2010 | Botich et al. | |
| 2010/0179794 A1 | 7/2010 | Shah et al. | |
| 2010/0280978 A1* | 11/2010 | Shimada et al. | 706/12 |

OTHER PUBLICATIONS

Abstarct of Lyon et al. Reference, Mar. 29-Apr. 2, 2011, 2011 Annual SRII Global Conference, IEEE Computer Society, 2 pp.*

Ross, et al. "Collaborative Filtering and Carbon Footprint Calculation," Department of informatics; May 17-19, 2010, University of California, 1 pp.

Torsello, "Four Metrics for Efficiently Comparing Attributed Trees," Aug. 23-26, 2004, vol. 2, pp. 467-470.

Romanowski, "On Comparing Bills of Materials: a Similarity/distance Measure for Unordered Trees."

"Eco-indicator 95" available at http://www.pre.nl/eco-indicator95/eco-indicator95.htm#Backgound.

Koutitas, "Low Carbon Network Planning," Apr. 12-15, 2010; pp. 411-417.

Gautam, et al. "Context-based Similarity Measures for Categorical Databases," Publication Date: 2000; pp. 201-210.

Cai and Yau, "Categorical Clustering by Converting Associated Information," Publication Date: 2006; p. 31-36.

Bouley, Dennis, "Estimating a Data Center's Electrical Carbon Footprint," research paper, copyright 2010.

Cai, et al., "A Singular Value Thresholding Algorithm for Matrix Completion," 2008.

Romanowski, "A Data Mining Approach to Forming Generic Bills of Materials in Support of Variant Design Activities." J. Comput. Inf. Sci. Eng. 4(4), 316-328 (Jan. 4, 2005).

Cheng. et al., "A Web Service Framework for Environmental and Carbon Footprint Monitoring in Construction Supply Chains," available at http://eil.stanford.edu/publications/jack_cheng/jack_greenSCOR_web_final.pdf. Copyright 2011 by Elsevier Ltd.

Tae-Wan Ryu and Eick, "Similarity Measures for Multi-valued Attributes for Database Clustering," available at http://citeseerx.ist.psu.edu/viewdoc/download?doi=10.1.1.54.3544&rep=rep1&type=pdf, 1998.

* cited by examiner

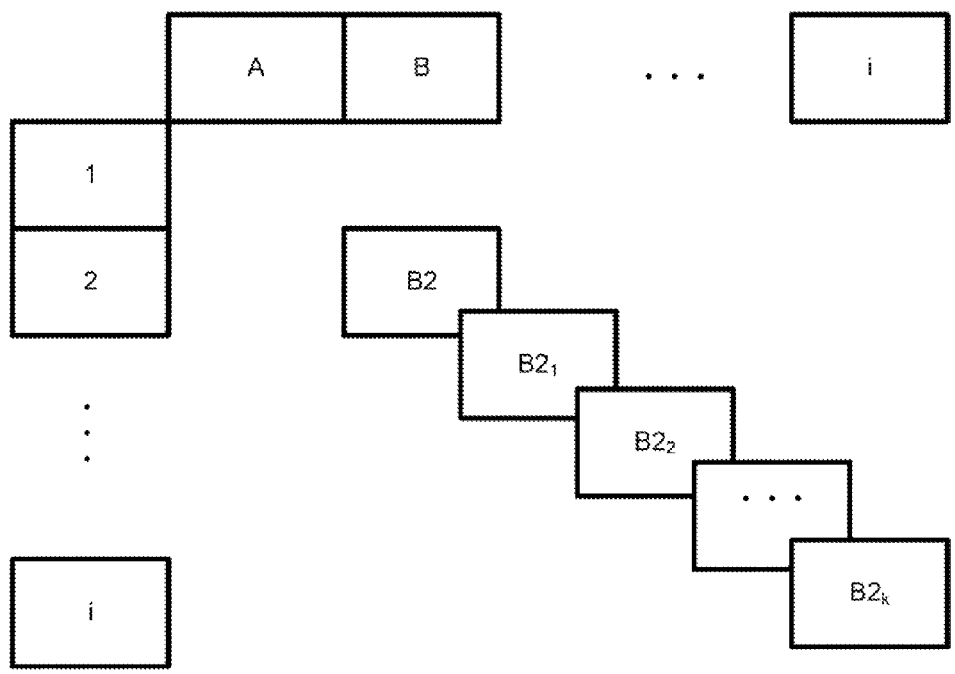

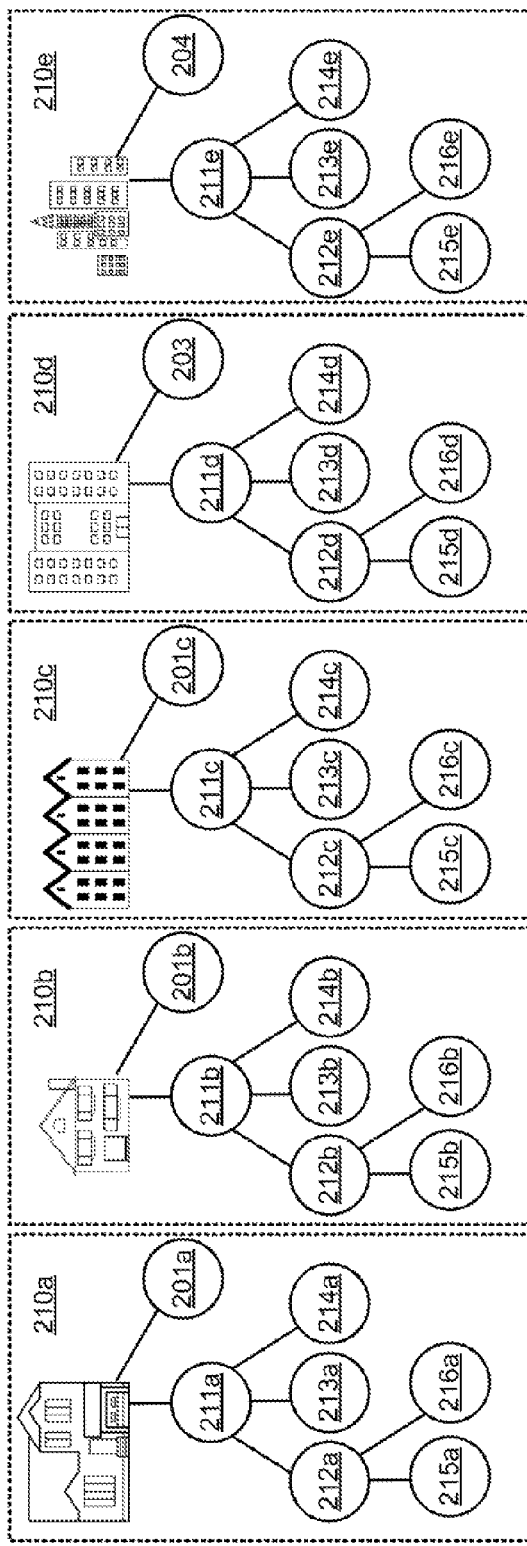

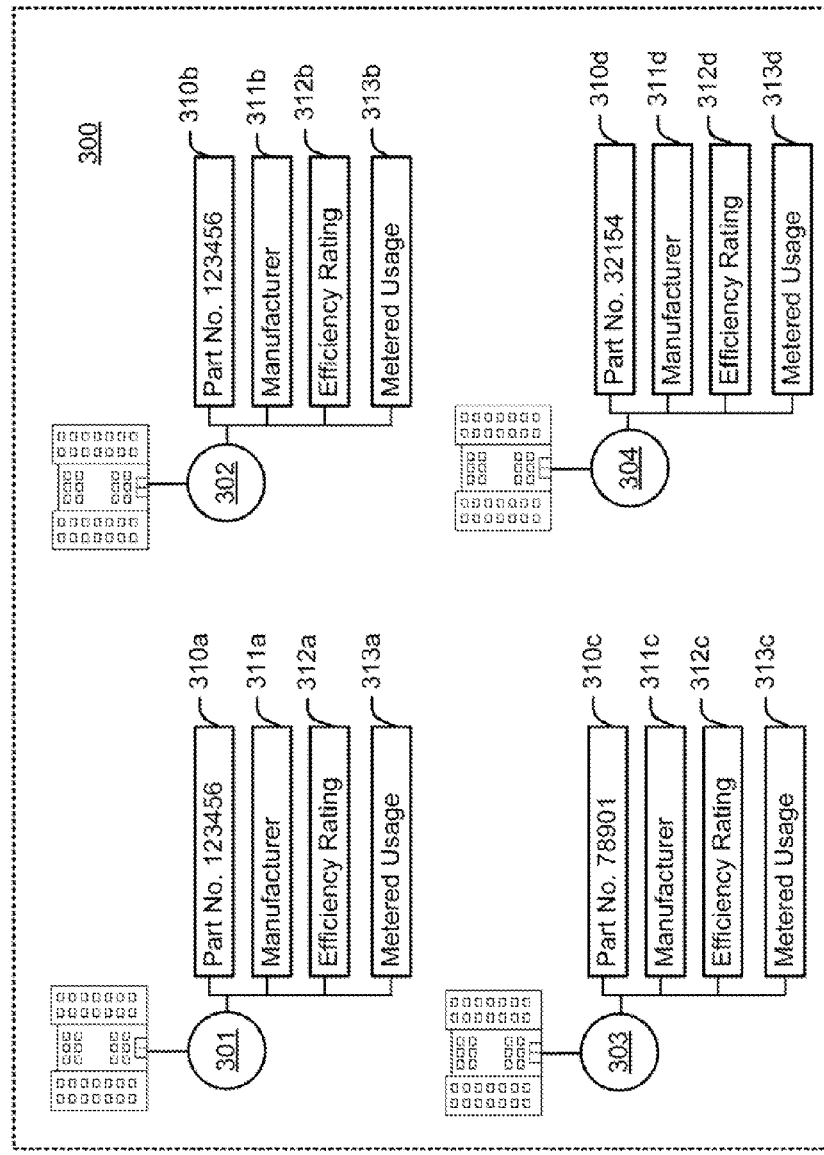

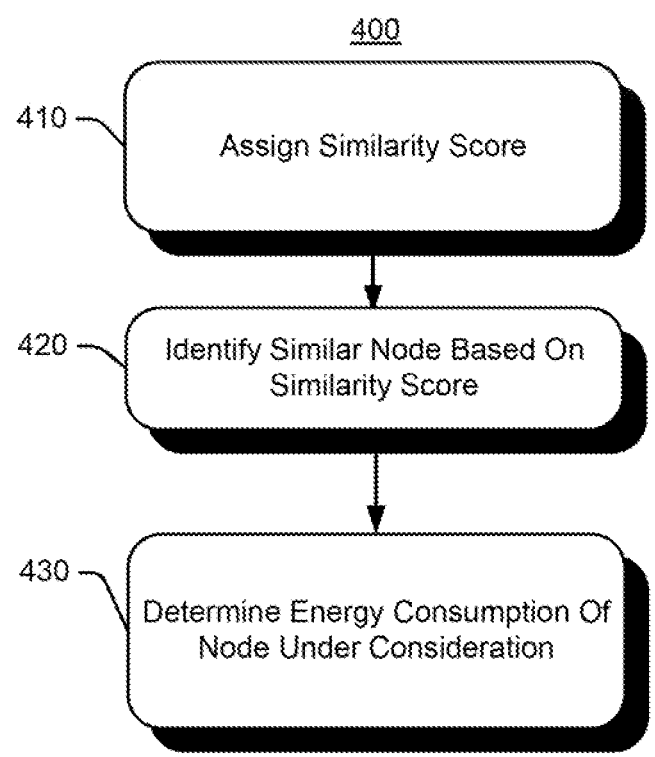

ENERGY CONSUMPTION ANALYSIS USING NODE SIMILARITY

BACKGROUND

Energy consumption, and planning to provide for expected future demand, is an ever increasing concern for individuals, businesses, utilities, and the government. Traditionally, energy consumption (e.g., electric and natural gas, in addition to other resources such as water) has been metered in bulk using meters between the utility and the point of consumption (e.g., homes and buildings). While these meters provide an effective manner of monitoring overall use for billing purposes, these meters provide little information about the energy consumption beyond the meter.

More recently, so-called "smart" meters have been deployed in various locales. The term smart meter typically refers to electric meters, but can also be extended to other types of meters. Smart meters record consumption in time intervals, and communicate the time and corresponding usage to remote locations for more detailed monitoring. For example, smart meters may enable real-time or near real-time monitoring of electric consumption which enables the identification of usage patterns. The utility companies may use this information to better anticipate demand and/or provide feedback to the consumers for making better use of their energy consumption.

While smart meters provide better granularity in the measurements, even smart meters lack any ability to quantitatively understand consumption among a number of different types of consumers (e.g., buildings and people in those buildings). Any patterns and/or use characteristics are identified manually, using prior experience and ad hoc methods, and therefore are subject to wide variations and errors in any conclusions that can be drawn from the data. There is no meaningful way to compare energy consumption of different buildings. Consumption cannot be directly compared because the building characteristics may be very different.

BRIEF DESCRIPTION OF THE DRAWINGS

FIG. 2A illustrates an example structure for a multidimensional data structure.

FIG. 2B illustrates a plurality of node structures that may be provided in the data structure.

FIGS. 3A-B show an example of determining node similarity.

FIG. 4 is a flowchart illustrating example operations of determining node similarity.

DETAILED DESCRIPTION

Figure 1:
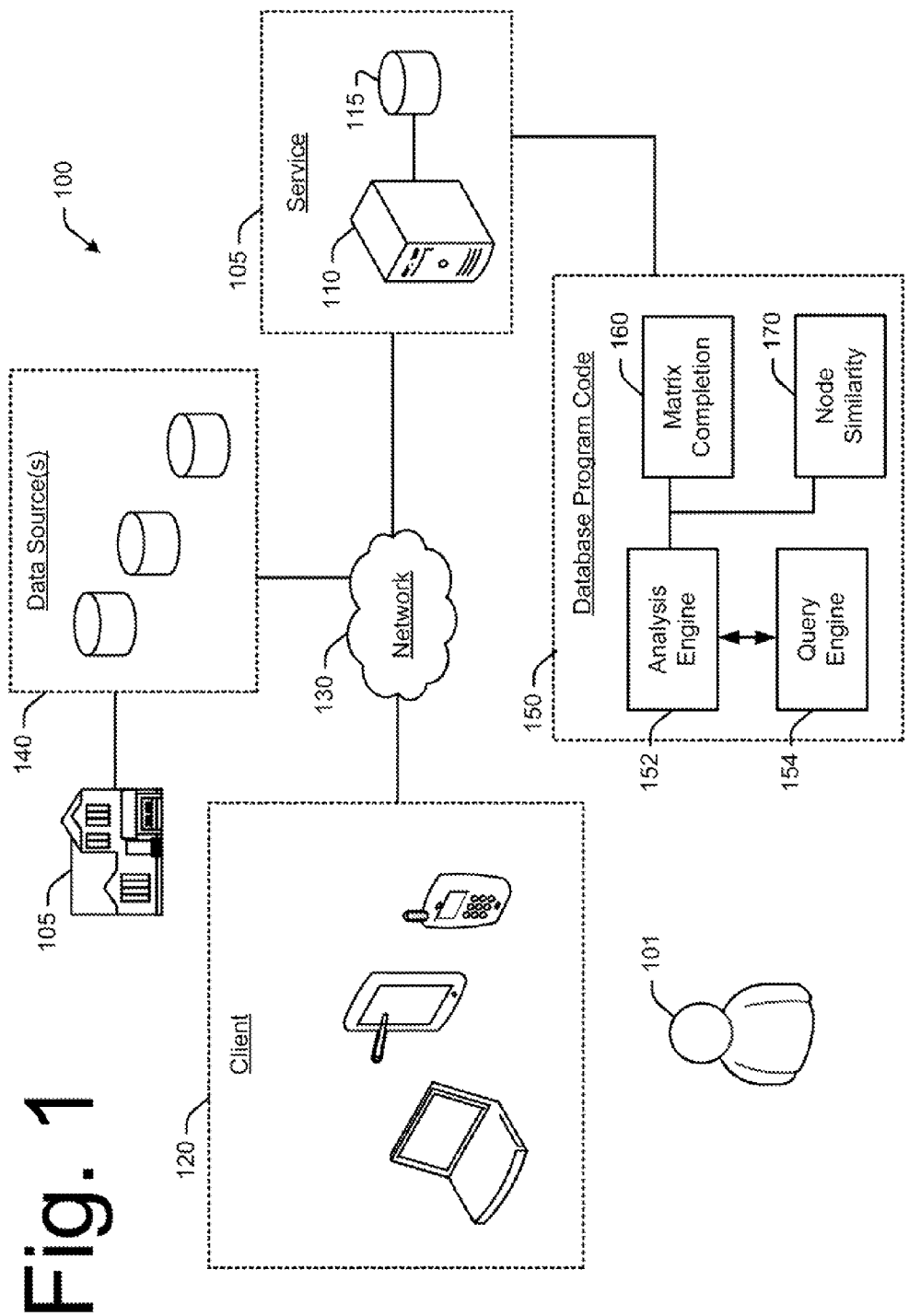
FIG. 1 is a high-level block-diagram of an example system that may implement node similarity.

Patterns and/or use characteristics may be identified by analyzing similarity in data. Systems and methods are disclosed herein for analyzing energy consumption using node similarity. Analysis may include energy consumption estimation and comparison. For example, data sources such as residential and commercial buildings may be grouped in terms of energy consumption (or other characteristic) to quantize a similarity metric between various consumer types (e.g., types of buildings and people in those buildings). In an example, domain-based rules, attribute-based rules, and/or model-based rules may be used in the analysis of similarity metrics.

For purposes of illustration, estimating a similarity metric between two types of buildings (e.g., an apartment complex) may be used to quantify a likelihood that other similar buildings (e.g., other apartment complexes) have similar energy consumption, without having to actually measure the energy consumption at each building individually. If the energy consumption data is available for the two buildings, the similarity metric allows comparison regarding which building is more energy efficient. Thus, the similarity metric enables individuals, businesses, utilities, the government, and others to more readily manage current usage in addition to planning and providing for expected future demand.

The energy consumption of a building depends on a variety of factors, such as size, occupancy, use (e.g., residential, office, manufacturing, or retail), location, and type and number of energy-consuming appliances. A meaningful comparison of the energy consumption between two buildings considers these and/or other conditions. A similarity metric that incorporates some or all of these factors provides meaningful comparisons between the buildings.

Without any loss of generality, the similarity metric can be normalized between 0 and 1, with 0 indicating no similarity and 1 implying that the two buildings are identical with regard to energy consumption. Given a particular building, the similarity metric can then be used to identify a list of k most similar buildings, which, for instance, may be ranked in terms energy consumption based on other similar buildings.

Similarity measures for continuous (and ordinal) data are known. For example, the L1 norm (Manhattan distance) or L2 norm (Euclidian distance) are commonly used. However, for categorical data as described herein, no such universal measures exist which work well for a variety of metrics in a variety of contexts.

There exist approaches for comparing buildings in terms of energy consumption that are manual implementations. For example, a domain "expert" may survey the buildings under consideration and determines similarity based on typical energy usage for a home in a particular zip code. Or even consider other building attributes such as size, occupancy, etc, but the approach is laborious, ad hoc and subjective. But these approaches do not define a similarity metric or consider other attributes (e.g., size and occupancy) that can significantly impact energy usage.

The similarity metric described herein can be used for energy efficiency assessment of a particular building, and can be used to compare the building with peers. The energy consumption distribution of similar buildings can be found and the building can be ranked or positioned, e.g., in terms of a percentile. The similarity metric can also be used for clustering buildings into classes or levels, or used for applying other algorithms where a "distance" metric between the nodes is needed for further analysis of the data.

Although described herein with reference to energy consumption for buildings, it should be understood that energy consumption is one example of using the similarity metric. Other examples are also contemplated. For example, the similarity metric may also be defined for water consumption of two buildings (or groups of buildings). In another example, the similarity metric may be defined for other consumption patterns, such as but not limited to, waste generation, telecommunication usage, or in terms of a particular characteristic, such as, the susceptibility of buildings earthquakes or other natural disasters.

Before continuing, it is noted that as used herein, the term "includes" means includes but not limited to, the term "including" means including but not limited to. The term "based on" means based at least in part on.

FIG. 1 is a high-level block-diagram of an example computer system 100 which may implement node similarity. System 100 may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the system 100 may include a host 110 providing a service 105 accessed by a user 101 via a client device 120. For purposes of illustration, the service 105 may be a data processing service executing on a host 110 configured as a server computer with computer-readable storage 112. The client 120 may be any suitable computer or computing device (e.g., a mobile device) capable of accessing the host 110. Host 110 and client 120 are not limited to any particular type of devices. It is also possible for the host 110 and client 120 to be the same device (e.g., a kiosk platform). Although, it is noted that the database operations described herein which may be executed by the host 110 are typically better performed on a separate computer system having more processing capability, such as a server computer or plurality of server computers. The user interface may be provided on any computing device for providing data to, and receiving data from, service 105. For example, the host may display the results requested by the user in a variety of visual representations and textual formats, depending on type of results, user preferences, client devices, network type and bandwidth.

The system 100 may also include a communication network 130, such as a local area network (LAN) and/or wide area network (WAN). In one example, the network 130 includes the Internet or other mobile communications network (e.g., a 3G or 4G mobile device network). Network 130 provides greater accessibility to the service 105 for use in distributed environments, for example, where more than one user may have input and/or receive output from the service 105.

In an example, the host 110 is implemented with (or as part of) the service 105 in the networked computer system 100. For example, the service 105 may be a cloud-based service, wherein the host 110 is at least one server computer in a cloud computing system. The host 110 may be provided on the network 130 via a communication connection, such as via an Internet service provider (ISP). In this regard, the client 120 is able to access host 110 directly via the network 130, or via an agent, such as a network site. In an example, the agent may include a web portal on a third-party venue (e.g., a commercial Internet site), which facilitates a connection for one or more clients 120 with host 110. In another example, portal icons may be provided (e.g., on third-party venues, pre-installed on a computer or mobile device, etc.) to facilitate a communications connection between the host 110 and client 120.

Before continuing, it is noted that the host 110 is not limited in function. The host 110 may also provide other services to other computing or data processing systems or devices in the system 100. For example, host 110 may also provide transaction processing services, email services, etc.

In addition, the host 110 may be operable to communicate with at least one information source 140. The source 140 may be part of the service 105, and/or the source 140 may be distributed in the network 130. The source 140 may include any suitable source(s) for information about various characteristics of a building 105 and the associated energy consumption. For example, the source 140 may include databases for building materials and appliances, metered energy consumption, other sources, and/or a combination of these, to name only a few examples. The source 140 may include automatically generated and/or manual user input. If the source 140 includes user-generated data, an appropriate filter may be applied, e.g., to discard "bad" data or misinformation. There is no limit to the type or amount of information that may be provided by the source 140. In addition, the information may include unprocessed or "raw" data. Or the data may undergo at least some level of processing.

The host 110 may execute analysis using the information from the source 140 to generate output for use in device manufacture. For example, the host 110 receives information from the source 140 including building characteristics and energy consumption for a particular building. The host 110 may maintain the results in at least one data structure (e.g., a matrix or table or database) in computer-readable media 115. The data structure may be accessed by the host 110, which performs analysis based on input by the client 120, and outputs the results for the user at the client 110.

In an example, the host 110 performs the analysis described herein by executing database program code 150. The database program code 150 may include an analysis engine 152 and a query engine 154. In an example, the analysis engine 152 may be integrated into the query engine 154. The analysis engine 152 may be an SQL-based analysis engine, and the query engine 154 may be an SQL query engine. However, the operations described herein are not limited to any specific implementation with any particular type of database.

A system that implements operations described herein has the capability to take, by way of illustration, a description of a building under consideration (including characteristics) and assess various factors (e.g., size, occupancy, use, location, and type and number of energy-consuming appliances). The system may then output a list of similar buildings and/or an assessment of expected energy consumption for the building under consideration. Operations may be further understood with reference to the following discussion of an example implementation of machine readable instructions.

An example architecture of machine readable instructions for the database program code 150 is also shown in FIG. 1, which may execute program code for determining node similarity. In an example, the database program code 150 may be implemented in machine-readable instructions (such as but not limited to, software or firmware) stored on a computer readable medium (e.g., storage 115 in FIG. 1) and executable by one or more processor (e.g., on host 110 in FIG. 1) to perform the operations described herein. The database program code 150 may perform operations on at least one database (or other data structure). The database may be provided on the same or different computer readable medium (e.g., storage 115 in FIG. 1). It is noted, however, the components shown in FIG. 1 are provided only for purposes of illustration of an example operating environment, and are not intended to limit execution to any particular system.

During operation, the analysis engine 152 may be operatively associated with the query engine 154 to execute the function of the architecture of machine readable instructions as self-contained modules. These modules can be integrated within a self-standing tool, or may be implemented as agents that run on top of an existing database.

In an example, the architecture of machine readable instructions may include a matrix completion module 160. The matrix completion module 160 may estimate missing information, related to any attribute of a building, in a database of building nodes and attributes (e.g., the matrix). The information may include size, occupancy, use, location, and type and number of energy-consuming appliances for a building, among other characteristics.

The architecture of machine readable instructions may also include a node similarity module 170. The node similarity module 170 may be used to identify relevant characteristics of the building being assessed (e.g., the building "under consideration"). The characteristics of the building under consideration are then compared to the matrix of information in the database to identify any similar nodes.

It is noted that the functional modules are shown for purposes of illustration. Still other functional modules may also be provided. In addition, the functional modules may be combined with one another.

In an example, the database 115 may be a multidimensional data structure. FIG. 2A illustrates an example structure for a multidimensional data structure. In this example, the database is configured as a matrix 200 with information for each node. Example information may include, but are not limited to the following characteristics: size, occupancy, use, location, and type and number of energy-consuming appliances for a building, to name only a few examples.

In FIG. 2A, the matrix 200 includes a plurality of columns (A, B, . . . i) and a plurality of rows (1, 2, . . . j). The intersection of each row and column may be referenced by the combination of row label and column label. For example, the intersection of column B and row 2 may be referred to as B2. In an example, each row corresponds to a component (e.g., an energy consuming entity in a building), and is thus used to generate the nodes. The columns correspond to characteristics for the buildings.

The matrix 200 is not limited to the two-dimensional example given above. In another example, the program code may go to the intersection B2, and then read forward/backward in a third dimension to obtain more detailed information included about a building, such as but not limited to, energy efficiency data based on the year of construction. For purposes of illustration, the addresses in the third dimension may be referenced using any suitable symbols, such as subscripts, wherein the address is $B2_1, B2_2, \ldots B2_k$.

The information in the multidimensional data structure may be included in, or referenced by nodes. For example, an apartment complex node may reference intersection B2 in the matrix 200 for energy consumption information related to that particular apartment complex. It is noted that multiple nodes may reference the same address in the same matrix 200. By way of illustration, the apartment complexes in a particular locale within a city built at a particular time may each reference the intersection B2 in the same matrix 200, if intersection B2 includes information for the energy consumption of appliances that is the same (or similar) for each apartment complex.

The matrix 200 shown in FIG. 2A is shown and described herein as an example of an example of a data structure that may be used. It is noted, however, that the node structures may be based on information provided in any suitable format(s).

The node structure provided in the database may be better understood from the following discussion with reference to FIG. 2B. FIG. 2B illustrates a plurality of node structures 210a-e that may be provided in the database. The node structures 210a-e each have a plurality of nodes. Each node in the node structure 210a-e may further include subnodes, thereby defining a child-parent relationship between the nodes, and providing additional layers of granularity for the building characteristics. This is a containment hierarchy. That is, the parent is a larger power consuming entity such as a building and the child nodes are rooms, and further the appliances are children of the room nodes.

For purposes of illustration, the node structures 210a-c are for buildings. It is noted that any suitable number of nodes and type of other node structures may be also used. For example, node structure 210d is for an apartment complex, and node structure 210e is for an office complex. Accordingly, nodes that are suitable identifying a similarity metric may be found in node structures that are not necessarily related to one another in a conventional sense. For example, an apartment complex is different than an office complex in most regards. But there may be overlap in at least one of the nodes. For example, a mixed-use building may have nodes in common with both the apartment complex and the office complex.

During operation, program code (e.g., the database program code 150 in FIG. 1) is executed to create a node structure for the building under consideration. The program code is also executed to identify and analyze existing node structures (e.g., node structures 210b-e). In an example, the program code traverses the node structures and identifies similar nodes.

The program may also be executed to rate the nodes. The nodes may be rated based on information in the database (e.g., in matrix 200 in FIG. 2A), to identify similar characteristics of the building under consideration based on characteristics of known buildings, and thus to determine energy consumption of the building under consideration. In an example, a higher rating may indicate a higher similarity than a lower rating (although the opposite may also be true).

The ratings may also be weighted. For example, building use (residential versus commercial) may receive a higher weighting than building occupancy.

Figure 2C:
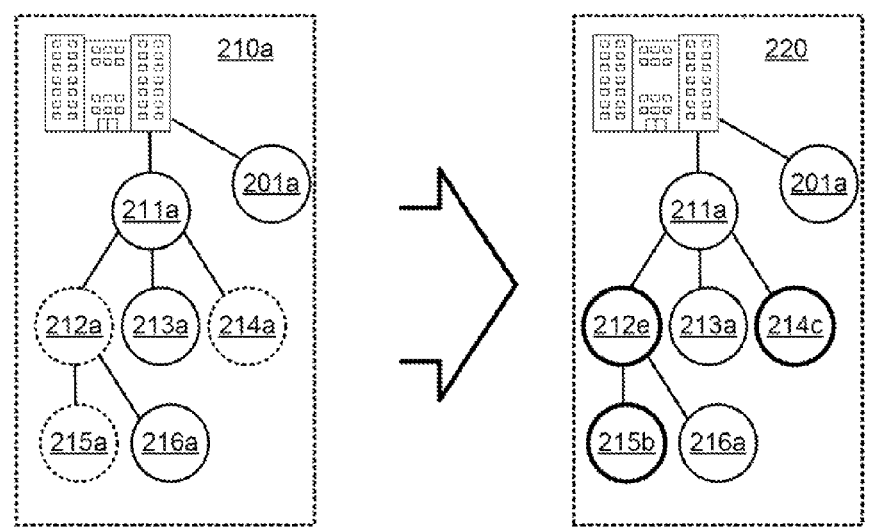
FIG. 2C shows an example of a new system node.

After similar nodes are identified, the program code may further be executed to determine energy consumption for the building under consideration using nodes and/or subnodes in other node structures. FIG. 2C shows an example of a new node structure 220. In this example, the new node structure 220 is created from the node structure 210a. But the new node structure 220 is created with the nodes 214c and 215b from other node structures because these node have the highest similarity for those particular building characteristics.

It is readily appreciated from the above discussion that the systems and methods may be utilized to provide a quick assessment of a large amount of information for a wide variety of different buildings, and with high accuracy. The systems and methods may be used to determine the energy consumption of many types of buildings.

In this regard, the systems and methods may be implemented as a building assessment service. For example, the systems and methods may be used by enterprises seeking to construct new, higher energy efficiency buildings. Many of these enterprises are turning to so-called "green" ratings organizations to help assess and reduce energy consumption and overall environmental footprint. The systems and methods not only enable such enterprises to competitively reduce the environmental footprint of their own buildings, but to also reduce the environmental footprint of their occupants.

In addition to environmental impact, the systems and methods also provide the foundation for energy consumption planning, both by consumers (e.g., individuals and businesses occupying buildings) and suppliers (e.g., utilities and government). The ability to automate energy analysis may be a differentiator for some in reducing price and scaling to meet the demands of the future.

Figure 3B:
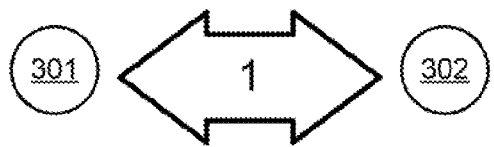
Figure 3B:
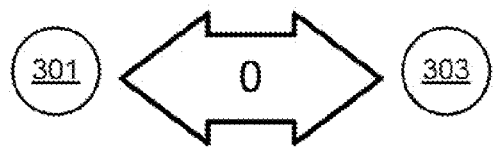
Figure 3B:
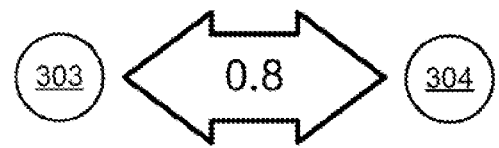

FIGS. 3A-B show an example of determining node similarity. In this example, each entity in the database is referred to as a node 300. Each of a plurality of nodes 300 is associated with a set of attributes. The attributes (illustrated by 310a-d, 311a-d, 312a-d, and 313a-d for nodes 301-304, respectively) may be numerical, discrete, categorical, textual description, visual, auditory, etc. Examples of some attributes include, but are not limited to: size, occupancy, use, location, and type and number of energy-consuming appliances for a building. The object is to estimate a normalized similarity metric between any two or more nodes belonging to the same or different databases.

More detailed matching techniques are described in detail below. For now it is sufficient to understand that attributes may be analyzed, for example, by comparing at least one measurable aspect. For example, comparing text using the longest common string march for matching text strings, pixel matching for matching pictures, and so forth.

A similarity metric of one indicates a match (e.g., the same node). For example, nodes 301 and 302 for the appliances are assigned a similarity metric of one because the nodes 301 and 302 are identical (all attributes match). A similarity metric of zero indicates no match (e.g., a commercial oven versus a residential oven). Intermediate values between 0 and 1 indicate various degrees of similarity between the nodes. For example, nodes 303 and 304 for kitchen appliances are assigned a similarity metric of 0.8 because the kitchen appliances are not identical, but have sufficient common attributes (built by different manufacturers during the same time period) to gauge energy consumption.

Knowledge of similarity between two nodes also enables a corresponding distance metric to be estimated. For example, if "s" represents similarity, then "1-s" or "1/s" or other similar mappings may be used to represent a distance metric between nodes. Since one can be derived from the other, the discussion herein refers to similarity and distance metrics interchangeably.

For purposes of illustration, three techniques of estimating similarity between nodes are described in detail below. It is noted, however, that the systems and methods are not limited to implementation by any particular technique. Other suitable techniques will also be readily apparent to those having ordinary skill in the art after becoming familiar with the teachings herein. In addition, any of these and/or other techniques may be combined in any of a wide variety of ways, with the possibility of one or more being used simultaneously with the user combining the results together to arrive at a similarity number, e.g., by weighted sum.

In a first example, a domain-based rules technique may be employed. This technique uses domain knowledge about the databases, the nodes within the databases, and any available contextual information, to construct a set of rules. The rules may then be used to determine the similarity between two nodes. For purposes of illustration, a simple rule may be defined such that two nodes from the same or substantially similar data source and having the same or substantially similar part numbers are assigned a similarity of one. Of course other rules could exploit specific knowledge of attributes of nodes.

In a second example, an attribute-based similarity metric may be employed. Multivariate attributes, typically available for each node, are used to compute a similarity metric. The final similarity metric comprises the similarity in each individual attribute. For purposes of illustration, the final similarity metric may include the weighted sum of the similarity of each of the attributes. The similarity function for each attribute may be defined by a domain expert. For example, similarity between string attributes may be computed from the longest common subsequence (LCS) match. In another example, similarity may be based on longest common prefix (LCP). In another example, similarity may be based on a combination of LCS and LCR. In yet another example, similarity may be computed using Levenshtein distance between strings. Other string matching algorithms may also be used. For example, similarity between numeric attributes may be computed using Minkowski distance.

The manner of combining the similarity of attributes may also be based on domain knowledge (e.g., determining the weights, if the weighted sum is used). The similarity of attributes may also be based on the usage scenario of the similarity metric.

In one example, the similarity metric between two nodes may be determined as follows:

$$S(N1,N2)=(1/Z)\Sigma Wi^*si(A1i,A2i)$$

where:
S( ) is the node similarity function;
N1, N2 are the nodes;
Wi is the weight assigned to the ith attribute similarity;
si( ) is the function that computes the similarity between the nodes' ith attribute A1 $i$, A2$i$ are the ith attributes of the two nodes, respectively; and
Z is a normalization constant.

The similarity metric between two nodes may be determined using cosine similarity to compare two vectors of attributes. The similarity metric may be determined as the dot product between the two attribute vectors, divided by the magnitude of both the vectors, as follows:

$$S=(A1 \cdot A2)/(|A1||A2|)$$

In a third example, a model-based similarity metric may be employed. In this technique, the similarity between two nodes is based on data that is available, such as but not limited to: textual descriptions of each of the nodes, data where similarity between nodes is already known (e.g., has been assigned manually by a domain expert).

In an example, if text descriptions of the nodes are available, topic models may be constructed for each node. These models may then be compared to determine the similarity between the nodes.

In another example, if a large number of node structures are available, contextual metrics may be computed for each node. These metrics pertain to the proximity of other nodes to a given node. For example, if the parent and children of two nodes are always the same, those nodes are likely to have a high similarity to one another.

In another example, a "labeled" data set is already available. In other words, the similarity between any two nodes in the data set is known. Such a data set can be used for training a machine learning model. The input to the model includes "features" extracted from the node attributes. The output is the similarity metric. A trained model, which has learned the relationship between the node features and the similarity metric, may be used to determine the similarity between two new nodes for which the similarity is not known, but the same features can be extracted from their attributes.

After selecting at least one of the techniques for determining similarity (or distance) metric, the technique(s) may be used to compute the similarity between any two nodes in a database. The similarity may then be used to construct a distance matrix between nodes of the database. The matrix can then be used to perform cluster (or group) analysis. The resulting clusters may be manually labeled by a domain expert. Clustering may also be used to approximate matching of nodes in two difference databases that do not share common attributes. Both databases may be separately clustered, and the clusters manually labeled for use. Thus, the task of matching nodes is reduced to matching the cluster labels of the two databases.

Before continuing, it should be noted that the examples described above are provided for purposes of illustration, and are not intended to be limiting. Other devices and/or device configurations may be utilized to carry out the operations described herein.

FIG. 4 is a flowchart illustrating example operations which may be implemented. Operations 400 may be embodied as machine readable instructions on one or more computer-readable medium. When executed on a processor, the instructions cause a general purpose computing device to be programmed as a special-purpose machine that implements the described operations. In an example implementation, the components and connections depicted in the figures may be used.

In operation 410, assigning a similarity score to a plurality of nodes using at least one of: domain based rules, attribute based similarity metrics, and machine learning. Domain-based rules may use domain knowledge to construct a set of rules based on node attributes. Attribute based similarity metrics may be determined based on multivariate attributes for each node. Model based similarity may be determined based on available node data.

In operation 420, identifying a similar node from the plurality of nodes, for a node under consideration, based on the similarity score. In an example, a similarity score of one indicates interchangeable nodes. A similarity score of zero indicates no match. The similarity score may be used to compute similarity between any two or more nodes in a database(s).

In operation 430, determining energy consumption of the node under consideration based on energy consumption of the similar node.

The operations discussed above are provided to illustrate various examples of determining node similarity. It is noted that the operations are not limited to the ordering shown. Still other operations may also be implemented.

For purposes of illustration, further operations may include rating the plurality of nodes for similarity to the node under consideration based on the similarity scores. In an example, the plurality of nodes may represent different buildings. In another example, the plurality of nodes may represent different building characteristics.

In an example, the plurality of nodes may include an associated energy consumption value. The characteristics may include at least building size, building occupancy, building use, building location, and type and number of energy-consuming appliances in a building.

It is noted that various of the operations described herein may be automated or partially automated. For example, building databases may be fully automatic using retrieval routines executed by program code. Alternatively, at least some user interaction may be provided. In such an example, the user may manually provide building specification(s), and then building node structures may be automatic based at least in part of the user-provided building specification(s). The level of user interaction may be any suitable degree. For example, the user may simply identify the building under consideration as an apartment complex having a particular number of units and built at a particular time. Alternatively, the user may identify individual characteristics of the apartment complex, including but not limited to, building materials, number of 1-bedroom, 2-bedroom, 3-bedroom units, and HVAC ratings.

In an example, the operations may be implemented with an end-user interface (e.g., web-based interface). The end-user is able to make predetermined selections (e.g., specifying the building type and year), and the operations described above are implemented on a back-end device to present the user with various expected building characteristics. The user can then further select which of the alternatives best describe the building under consideration.

Further operations may also include rating the nodes, wherein determining the energy consumption of a building under consideration is based at least in part on the rating of the nodes. The rankings may further be weighted. Still further operations may also include populating a database with characteristics of various buildings. The characteristics of the buildings may include size, occupancy, use, location, and type and number of energy-consuming appliances for a building, and other characteristics dependent at least to some extent on design considerations. Some design considerations may include which characteristics are desired by the user, required by regulation, and set forth in company policy, to name only a few examples.

Still further operations may also include identifying structural relationships between the nodes. For example, structural relationships may include, but are not limited to, parent-child nodes, and parent-grandchildren nodes.

In an example, further operations may include outputting a list of buildings with the at least one building on the list being most similar to the building under construction. The list may be printed for a user. In an example, the list may be vetted (e.g., by an expert) to ensure that the identified building(s) on the list are likely to be similar to the building under consideration. For example, a high-efficiency building constructed according to the most up-to-date environmental standards may not be similar to a typical building just because both buildings are residential and built during the same year.

It is noted that the examples shown and described are provided for purposes of illustration and are not intended to be limiting. Still other embodiments are also contemplated.

The invention claimed is:

1. A method of determining energy consumption using node similarity, the method carried out by program code stored on non-transient computer-readable medium and executed by a processor, the method comprising:
    creating a node structure for a node under consideration, the node structure including a plurality of nodes in a containment hierarchy defined by a child-parent relationship between the plurality of nodes in the node structure;
    assigning a similarity score to the plurality of nodes in the node structure using at least one of: domain based rules, and attribute based similarity metrics;
    identifying a similar node in an other node structure based on the similarity score; and
    determining energy consumption of the node under consideration based on energy consumption of the similar node in the other node structure.

2. The method of claim 1, further comprising rating the plurality of nodes for similarity to the node under consideration based on the similarity scores.

3. The method of claim 1, wherein domain based rules uses domain knowledge to construct a set of rules based on node attributes, wherein identifying the similar node is based on the set of rules.

4. The method of claim 1, wherein domain based rules include heuristics related to at least one of databases, nodes within the databases, and contextual information.

5. The method of claim 1, wherein the attribute based similarity metrics is based on multivariate attributes for each node.

6. The method of claim 1, wherein the plurality of nodes represent different buildings.

7. The method of claim 1, wherein the plurality of nodes represent different building characteristics.

8. The method of claim 1, wherein each of the plurality of nodes includes an associated energy consumption value.

9. The method of claim 1, wherein the characteristics include at least building size, building occupancy, building use, building location, and type and number of energy-consuming appliances in a building.

10. A system of determining energy consumption using node similarity, comprising:
a computer readable storage to store a node structure for a node under consideration, the node structure including a plurality of nodes in a containment hierarchy defined by a child-parent relationship between the plurality of nodes in the node structure, the plurality of nodes representing energy consumption characteristics of a building; and
an analysis engine operatively associated with the computer readable storage to determine energy consumption of a node under consideration based on energy consumption of a similar node for the node under consideration, the similar node found using a similarity score and identifying the similar node from the plurality of nodes based on the similarity score.

11. The system of claim 10, wherein the plurality of nodes represent different buildings.

12. The system of claim 10, wherein the plurality of nodes represent different building characteristics.

13. The system of claim 10, wherein each of the plurality of nodes includes an associated energy consumption value.

14. The system of claim 10, wherein the similarity score is based on a combination of domain based rules, attribute based similarity metrics, and machine learning.

15. The system of claim 10, wherein domain based rules uses domain knowledge to construct a set of rules based on node attributes.

16. The system of claim 10, wherein attribute based similarity metrics is determined based on multivariate attributes for each node.

17. The system of claim 10, wherein model based similarity is determined based on available node data.

18. A system of determining energy consumption using node similarity, comprising:
a non-transient computer readable storage for storing a node structure of a node under consideration, the node structure including a plurality of nodes in a containment hierarchy defined by a child-parent relationship between the plurality of nodes in the node structure;
a comparison engine executing on a processor and operatively associated with a computer readable storage to assign a similarity score to a plurality of nodes and use the similarity score to identify a similar node from the plurality of nodes; and
an energy analysis engine executing on a processor and operatively associated with a computer readable storage to determine at least one attribute of the node under consideration based on a known attribute of the similar node,
wherein the attributes represent buildings having known energy consumption.

19. The system of claim 18, wherein the attributes represent characteristics of buildings having known energy consumption.

* * * * *